June 1, 1943.     J. W. MacCLATCHIE     2,320,973
PUMP PISTON
Filed Oct. 7, 1940

INVENTOR.
JOHN W. MacCLATCHIE
BY Robert M. McManigal
ATTORNEY.

Patented June 1, 1943

2,320,973

UNITED STATES PATENT OFFICE 2,320,973

PUMP PISTON

John W. MacClatchie, Los Angeles, Calif., assignor to MacClatchie Manufacturing Company of California, Compton, Calif., a corporation of California Application October 7, 1940, Serial No. 360,092

2 Claims. (Cl. 309—4)

This invention relates to pistons used in mud pumps and the like.

More particularly this invention relates to that type of piston in which packing elements of resilient material are mounted on an axial support with an abutment projecting radially from the axial support which forms a backing for the packing elements.

The object of my invention is to provide a means for sealing off said packing elements with respect to said abutment.

Another object of my invention is to provide a packing element having an annular groove adjacent the radially projecting abutment so that any fluid leaking between the axial support and the packing element will expand the side of said groove adjacent the abutment to provide a fluid tight seal between said abutment and said packing member.

Another object of my invention is to provide a piston which is capable of withstanding considerable use at high pressures.

My invention has many other objects, advantages, and features, some of which, with the foregoing, will be set forth in the following description where I shall outline one form of my invention, which I have selected for illustration in the drawing accompanying and forming a part of the present specification.

Referring to the drawing.

Figure 1:
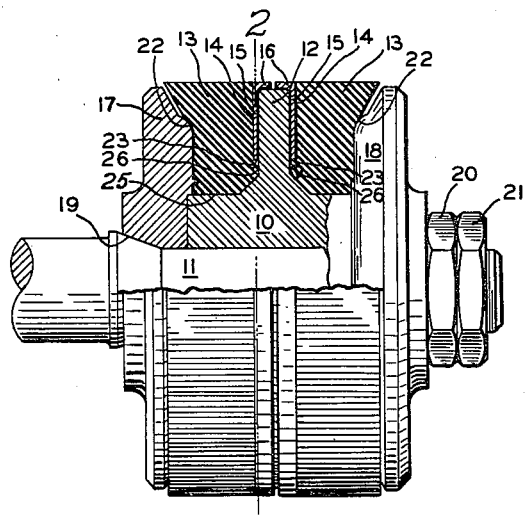
Figure 1 is a side elevation of a piston embodying the invention, partly in section.
Figure 2:
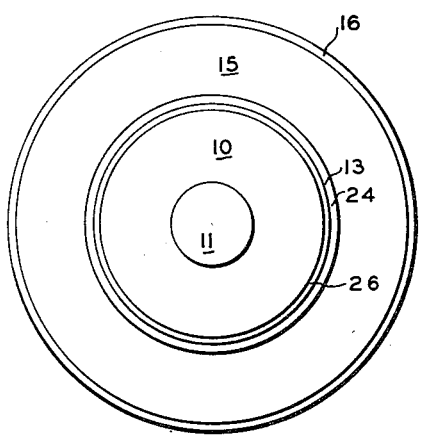
Figure 2 is a section taken along the line 2—2 of Figure 1.

The invention is illustrated embodied in a double acting piston, which comprises a hub 10 mounted on a piston rod 11. A radial flange or abutment 12 projects integrally from the hub 10 intermediate the ends of said hub. Mounted on the hub 10 on each side of flange 12 are packing elements 13, which may be formed of rubber or other suitable resilient material. The flange 12 forms a longitudinal backing for each of the packing elements 13. I prefer to reinforce the inner end 14 of the packing element 13 with a metallic plate, fabric or other suitable material. As an instance of this arrangement a metallic plate 15 having a flanged portion 16 is provided at the inner end of each packing element 13.

The packing elements are secured on the hub 10 by follower plates 17, 18 which are mounted on the piston rod 11 at the outer ends of the packing elements 13. In the example shown, the follower plate 17 is wedged on the piston rod as indicated at 19, the hub 10 is mounted on the piston rod 11 and the follower plate 18 is secured on said rod by means of a retaining nut 20 and a lock nut 21.

In order to provide a rigid backing for the packing element 13, I prefer to have the outer radial ends 22 of the follower plates 17, 18 extend out at least as far—and preferably further—than the inner radial ends 23 of the reinforcement plates 15.

Figure 3:
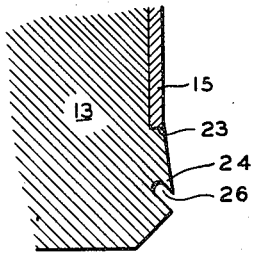
Figure 3 is a side view of a packing element in unassembled position, with a portion of the reinforcing flange cut-away.

As shown in Figure 3, I prefer to build up the lower portion 24 of the inner end 14 of the packing element 13 so that said lower portion 24 forms an angle with the reinforcement plates 15. The purpose of this added material is to make certain that the rubber or other resilient material adjacent the radial flange will be under compression in the assembled piston.

However, even though the portion 24 of the packing element 13 is under compression in the assembled piston, I have found that when such a piston without additional means to seal off the inner end of the packing element from the radial flange 12 is used in mud pumps operated at high pressures, that fluid passes between the hub 10 and the adjacent side 25 of the packing element and between the inner end 14 of the packing element and the radially projecting flange 12.

Means are therefor provided to positively seal off the packing elements with respect to the radially projecting flange 12 at all times and particularly on the pressure side of the piston. As an instance of this arrangement, the lower portions 24 of the packing elements 13 are provided with annular grooves 26 adjacent the radial flange 12, the sides of which grooves adjacent the radial flange are adapted to be expanded by fluid pressure to seal off said flange with respect to said packing members. Any fluid passing between the hub 10 and the adjacent side 25 of the packing element 13 which could otherwise escape between the radial flange 12 and the inner end 14 of said packing element 13 and thereby cut-out and damage said parts, passes into one of the annular grooves 26, thereby expanding the sides of said groove adjacent the radial flange 12 into fluid-tight engagement with said flange and sealing off said packing elements with respect to said flange.

I have found that pistons embodying the features of my invention have given excellent results, even when used on mud pumps operated at extremely high pressures.

From the foregoing description taken in connection with the accompanying drawing, the construction, operation, uses and advantages of my invention will be readily understood by those skilled in the art to which the invention appertains. While I have described the form of my invention which I now consider to be the best embodiment thereof, I desire to have it understood that the form shown is merely illustrative and that the invention is not to be limited to the details disclosed herein, but is to be accorded the full scope of the appended claims.

I claim:

1. In a pump piston, a hub, a radially projecting flange medial of the length of said hub and fixed against longitudinal movement relative thereto, annular packing elements mounted on the hub with the radially projecting flange forming a longitudinal backing for the packing elements, said packing elements having annular grooves adjacent said radially projecting flange, the sides of said grooves adjacent said radially projecting flange being adapted to be expanded by fluid pressure to seal off said packing members and said flange and followers for clamping said packing elements against said radially projecting flange.

2. In a pump piston, a hub, a radially projecting flange medial of the length of said hub and fixed against longitudinal displacement relative thereto, annular packing elements mounted on the hub with the radially projecting flange forming a longitudinal backing for the packing elements, each of the inner ends of said packing elements having reinforcement material, an enlarged portion adapted to be compressed on assembly to aid the sealing of said member with respect to said radially projecting flange and an annular groove in said enlarged portion, the sides of said grooves adjacent said radially projecting flange being adapted to be expanded by fluid pressure to seal off said packing members and said flange, and followers for securing the packing elements against the radially projecting flange, the outer ends of said followers being at least as far out radially as the inner ends of said reinforcement material.

JOHN W. MacCLATCHIE.